Figure 1:
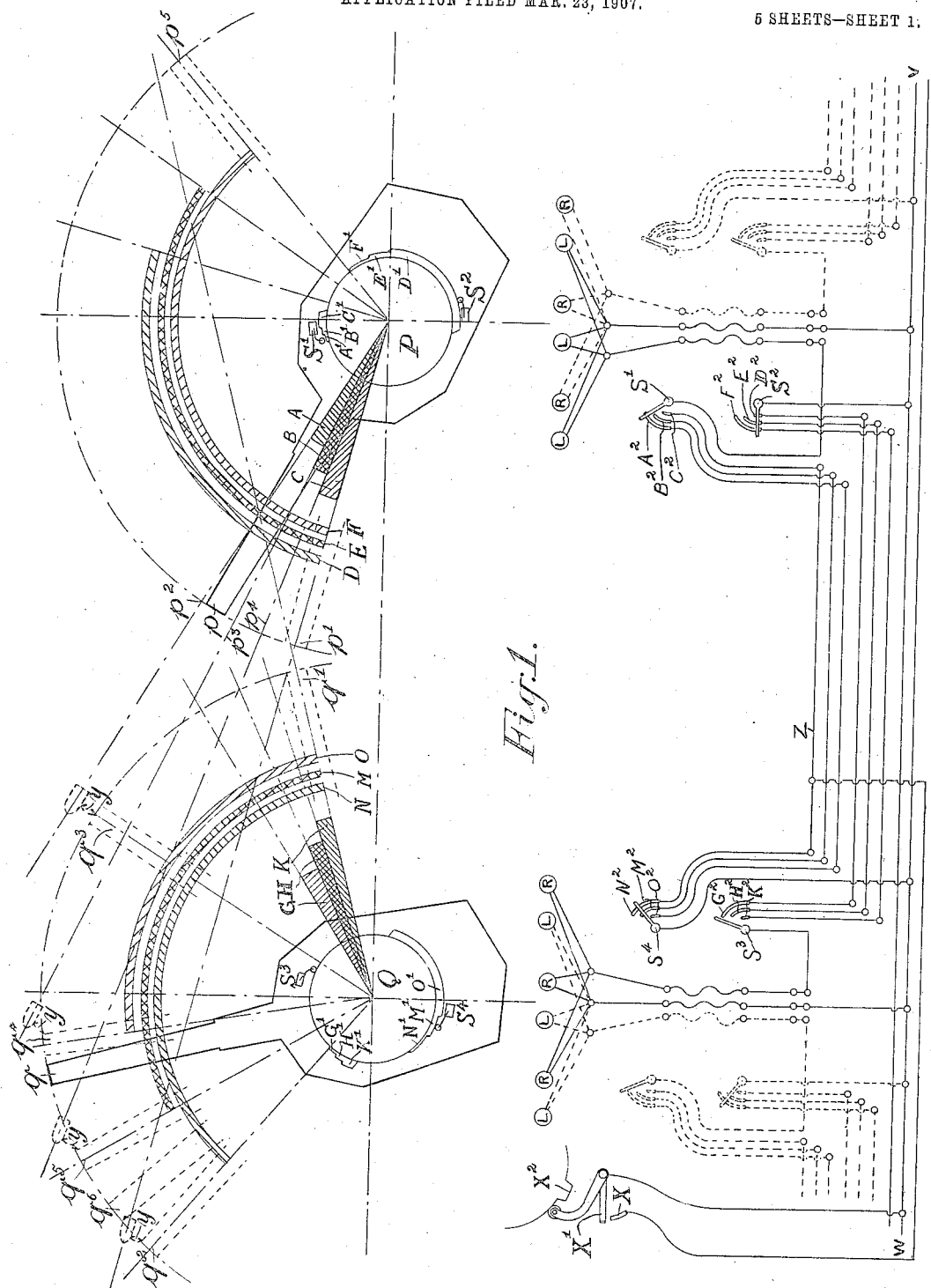

No. 889,852. PATENTED JUNE 2, 1908.
W. D. KILROY.
MEANS FOR AUTOMATICALLY INDICATING CERTAIN RELATIVE POSITIONS OF GUNS OR THE LIKE TO EACH OTHER.
APPLICATION FILED MAR. 23, 1907.

5 SHEETS—SHEET 1.

WITNESSES
INVENTOR

No. 889,852. PATENTED JUNE 2, 1908.
W. D. KILROY.
MEANS FOR AUTOMATICALLY INDICATING CERTAIN RELATIVE POSITIONS OF GUNS OR THE LIKE TO EACH OTHER.
APPLICATION FILED MAR. 23, 1907.

5 SHEETS—SHEET 2.

WITNESSES
INVENTOR
ATTY

No. 889,852. PATENTED JUNE 2, 1908.
W. D. KILROY.
MEANS FOR AUTOMATICALLY INDICATING CERTAIN RELATIVE POSITIONS OF GUNS OR THE LIKE TO EACH OTHER.
APPLICATION FILED MAR. 23, 1907.

5 SHEETS—SHEET 3.

WITNESSES
INVENTOR
ATTY

No. 889,852. PATENTED JUNE 2, 1908.
W. D. KILROY.
MEANS FOR AUTOMATICALLY INDICATING CERTAIN RELATIVE POSITIONS
OF GUNS OR THE LIKE TO EACH OTHER.
APPLICATION FILED MAR. 23, 1907.

5 SHEETS—SHEET 4.

WITNESSES
INVENTOR
ATTY

No. 889,852. PATENTED JUNE 2, 1908.
W. D. KILROY.
MEANS FOR AUTOMATICALLY INDICATING CERTAIN RELATIVE POSITIONS
OF GUNS OR THE LIKE TO EACH OTHER.
APPLICATION FILED MAR. 23, 1907.
5 SHEETS—SHEET 5.
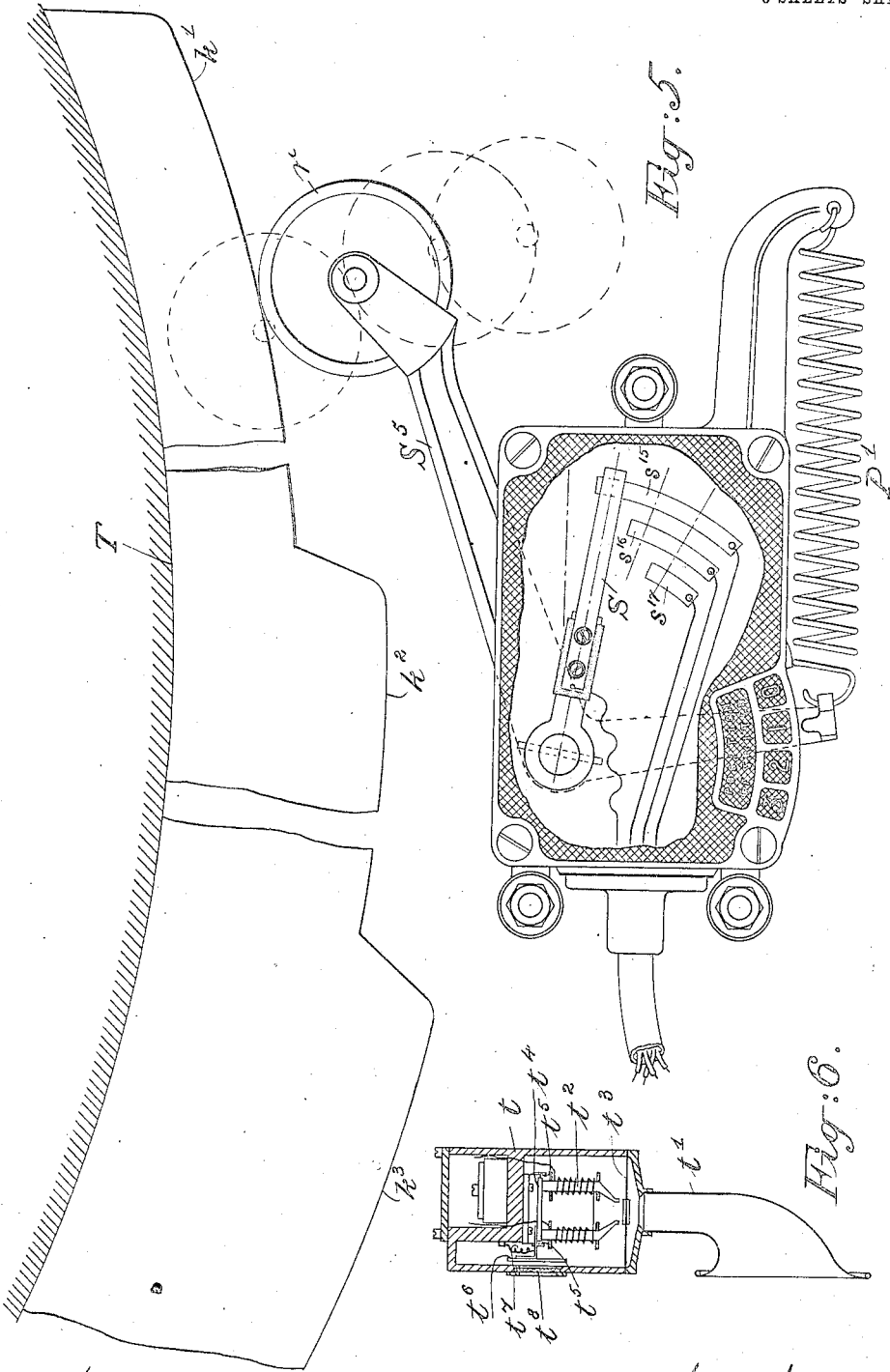
WITNESSES
INVENTOR

UNITED STATES PATENT OFFICE.

WILLIE DICKSON KILROY, OF HATCH END, ENGLAND, ASSIGNOR TO HIMSELF, AND EVERSHED & VIGNOLES LIMITED, OF CHISWICK, ENGLAND, A CORPORATION OF GREAT BRITAIN.

MEANS FOR AUTOMATICALLY INDICATING CERTAIN RELATIVE POSITIONS OF GUNS OR THE LIKE TO EACH OTHER.

No. 889,852.  Specification of Letters Patent.  Patented June 2, 1908.

Application filed March 23, 1907. Serial No. 364,196.

*To all whom it may concern:*

Be it known that I, WILLIE DICKSON KILROY, a subject of the King of Great Britain and Ireland, residing at Hatch End, Middlesex, England, have invented new and useful Improvements in and Relating to Means for Automatically Indicating Certain Relative Positions of Guns or the Like to Each Other, of which the following is a specification.

The object of this invention is to provide for warships and the like, in such cases as are hereinafter described, special means consisting of an improved system and arrangement of electrical apparatus and connections for automatically indicating certain relative positions of a gun or guns with one or more other guns or turrets whereby a loud audible signal or a visible signal or both are given to serve as a warning to the operators of the guns or turrets as to the relative training of their own gun to that of an adjacent gun, guns, turret or turrets, when that relative training may, in the event of one or more of the said guns being fired, become a source of danger to one or other of the adjacent guns or turrets.

The tendency in the design of the armament in modern warships is to eliminate guns mounted in casemates or in central batteries and to replace them with guns mounted in turrets.

It is obvious that the training stops of guns may be so placed in a ship that the said guns can only endanger other guns, turrets or parts of gun mountings when they are fired at their extreme trainings or very near such positions. The possible danger angles of mutual interference will then be small and a danger signal need only sound to prevent the gun being fired over such a small angle that a very slight alteration in training to the right or left as the case may be would permit of safe firing, as the gun would have been trained out of the danger zone. This invention does not apply to such cases as these, where other more simple means may be adopted. It is however advantageous to allow each turret to have as large a range of training as possible, in order that the full benefit of the modern arrangement of guns may be obtained. The arcs of training over which the guns can fire are being therefore increased, and in many cases it so happens that the danger angles of mutual interference are also largely increased thereby.

The object of this invention is to provide an adequate system of danger signals which does not unnecessarily restrict the firing, in order to meet such cases as those last described in which the angles of mutual interference are large; and also to allow of greater freedom in the design of arrangements of gun turrets in warships by permitting the danger angles of mutual interference to be safely enlarged, with a consequent further increase in range of training of guns.

The present invention consists in means of dividing up the danger angles of mutual interference, and of making certain corresponding electrical connections in manner to be hereinafter more particularly described; with the result that the angle over which a warning signal is given may be reduced to any desired extent.

The following is a description of the system in which this invention is applied. To the gun turret trunks or other suitable part of the movable turrets is fixed a series of cams which actuate danger switches fixed to the ship and which are set in prearranged and definite positions corresponding to the proposed divisions of the danger angles of gun training. If preferable any other mechanical means of actuating the danger switches may be used provided the said switches are thereby adapted to make, at the same definite prearranged positions, the required electrical connections described hereinafter.

The danger switches (when joined up as described hereinafter) make the necessary electrical connections to actuate the danger trumpets or other suitable warning device which are placed in the turrets conveniently near the gun-operators.

The system has been designed with a view to the greatest simplicity. Thus, if two guns are so trained that one can fire without danger to the other either from shot or blast, although its own muzzle is in the line of fire of the other gun, the danger trumpet is only in operation in the turret whose gun will do damage by firing. Hence, a danger signal will always have the same meaning viz:— "If you fire you will do damage", in other words "Don't fire". Of course, both turrets may be so trained that it is dangerous for either to fire, and in that case, the danger signal will be given in both turrets. This system of automatic signaling is operated by means of a motor alternator which generates an alternating current of suitable frequency to actuate the danger trumpets although if desired the system of connections may be used with any source or kind of electrical energy so that it be suitable to work any known and suitable form of indicating or sounding apparatus to serve as a danger signal in gun turrets.

In order that the invention may be better understood it will now be described in relation to the accompanying drawings.

Figure 2:
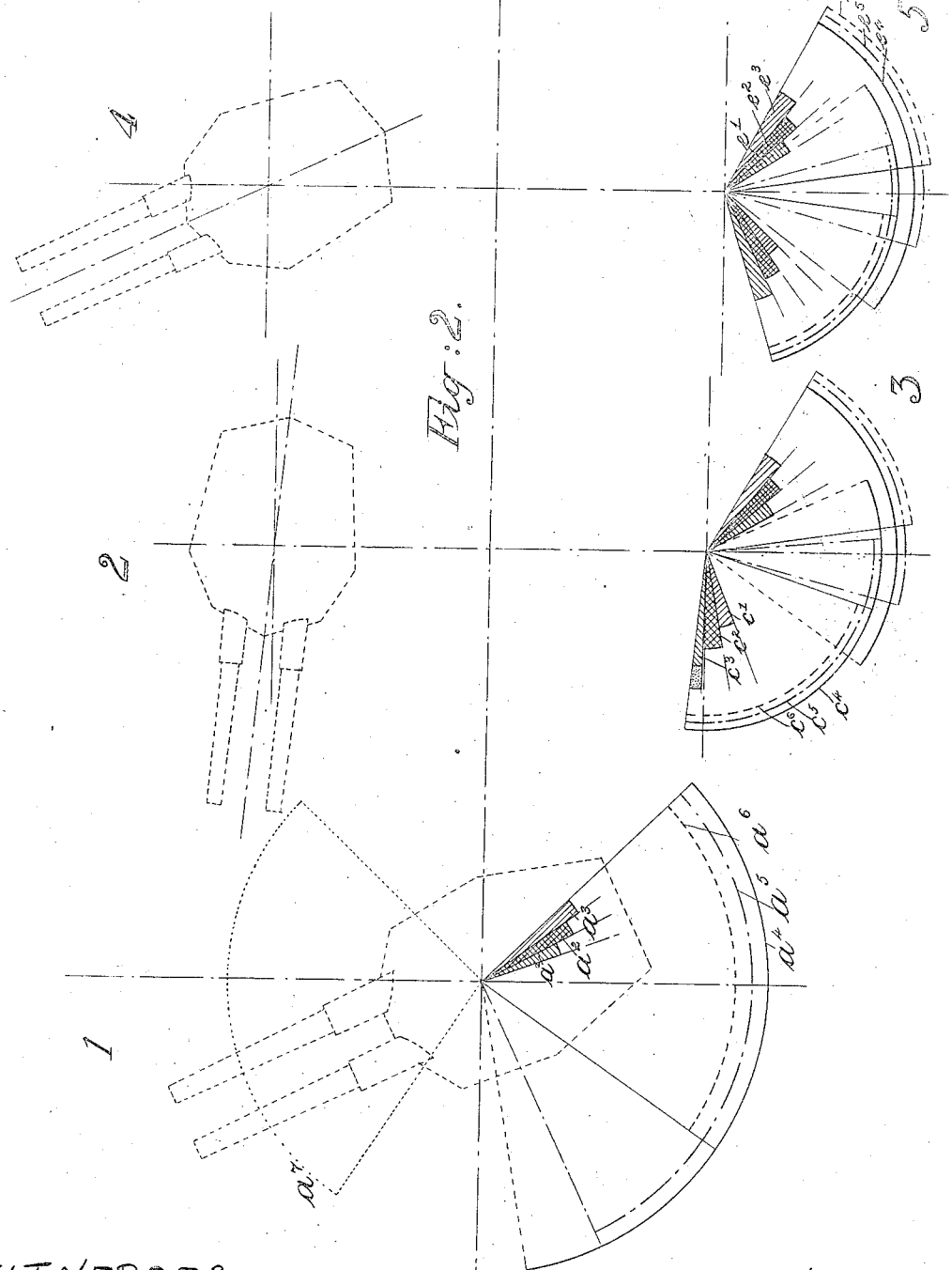
Figure 3:
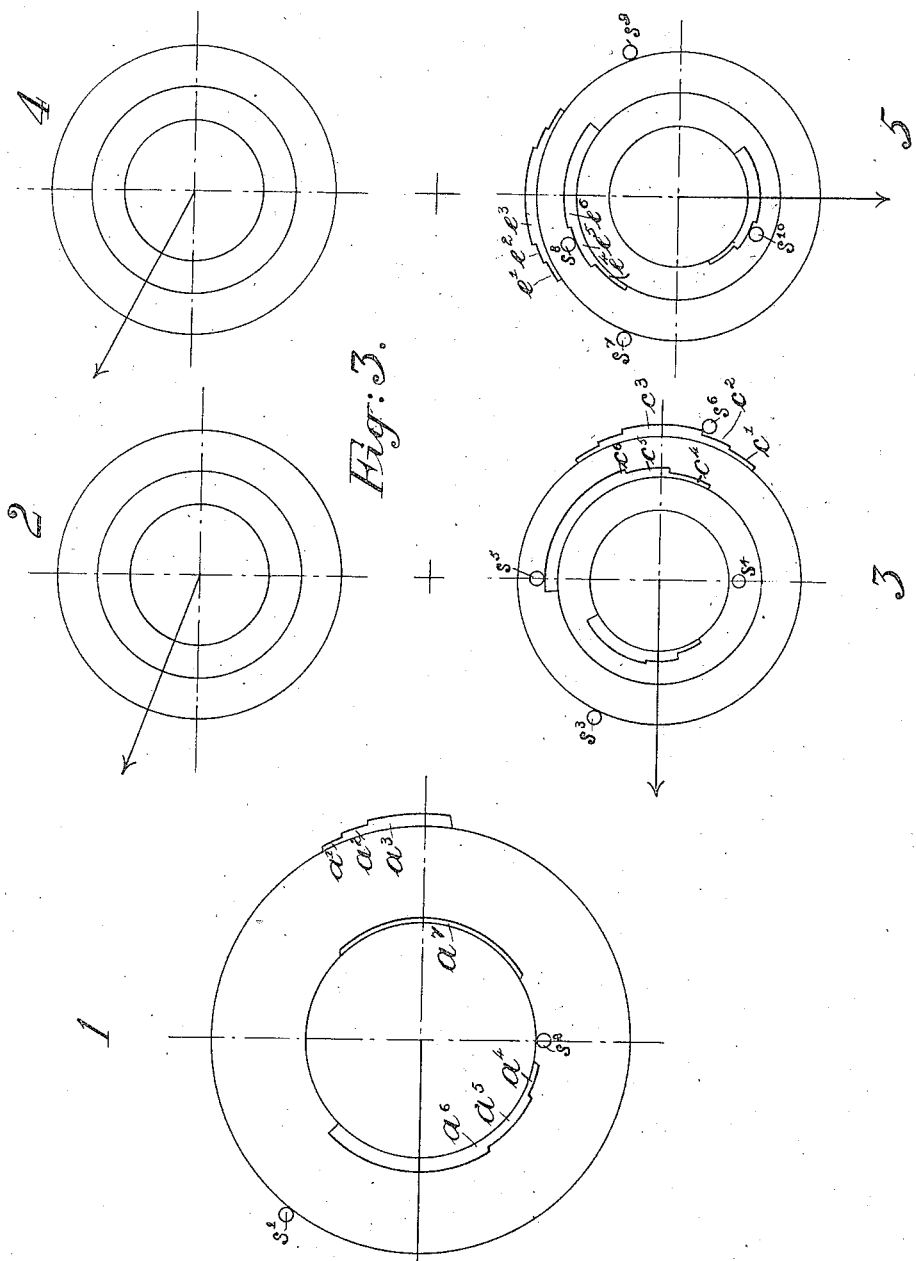
Figure 4:
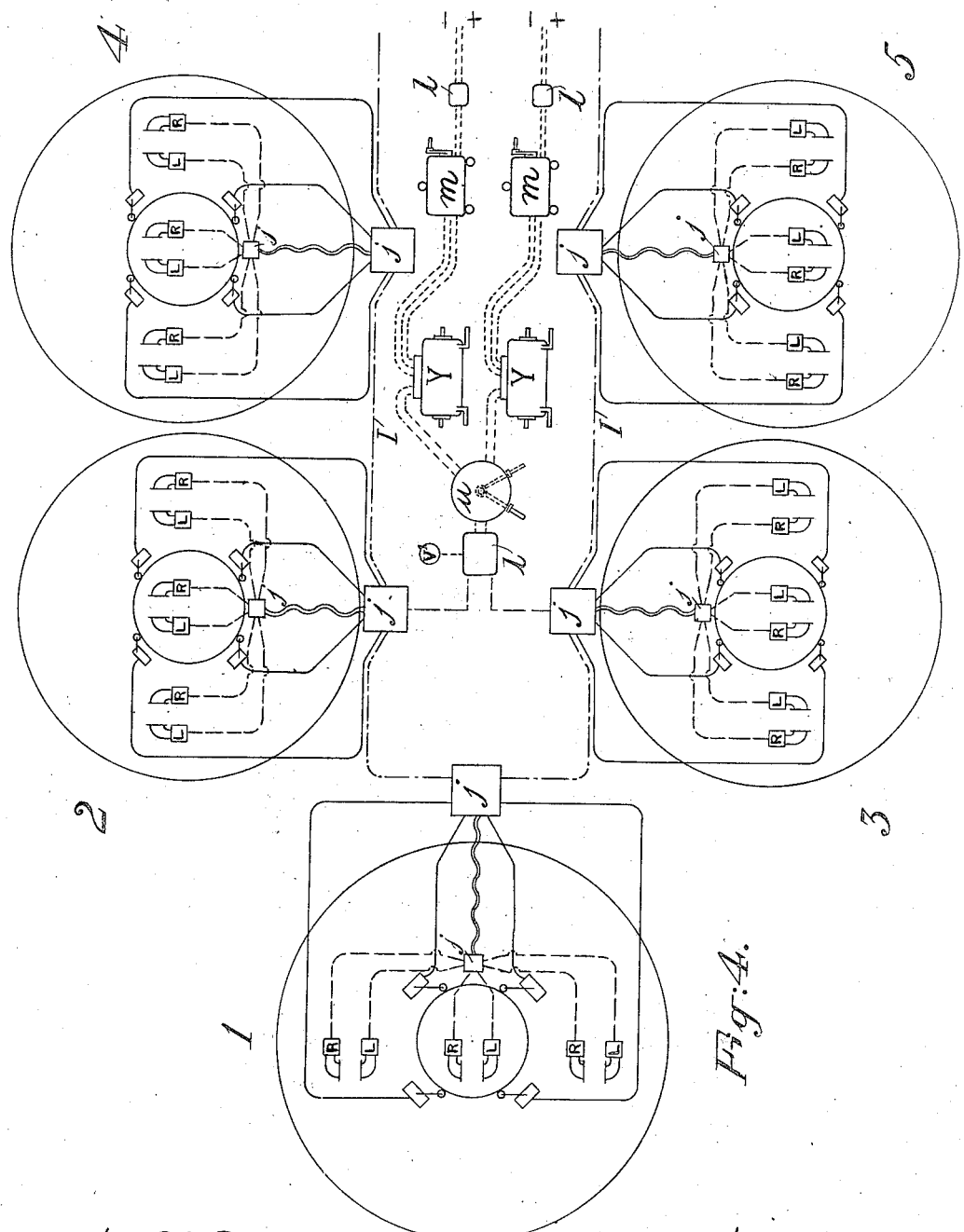

Figure 1 shows in outline two gun turrets, their danger angles of mutual interference, the geometrical method employed to work out this system and a diagrammatic representation of the cams, danger switches and electrical connections to the various essential parts of the apparatus. Fig. 2 shows the danger angles of five gun mountings for a part of a battleship. Fig. 3 shows diagrammatically the cams and switches for the gun mountings for a part of a battleship. Fig. 4 shows the general arrangement of cable connections and apparatus arranged for the five gun mountings for part of a battleship. Fig. 5 shows an outside view of "danger" switch, turret cams actuating it and a diagram showing inside switch contacts. Fig. 6 shows the danger trumpet which I prefer to use with this system.

By reference to Fig. 1, it will be seen that the two guns P and Q are shown capable of being trained about their centers of rotation in various relative positions. The fixed training stop for the gun P on its left extreme training is shown by position $p^1$, and similarly the extreme training for the gun Q on its right by position $q^1$. The extreme training positions for the gun P on its right and the gun Q on its left are not shown as they are not necessary for the purpose of this diagram. To plot out the danger angles for these two guns P and Q; train the gun P to $p^1$ and produce the center line of the bore of the gun; train the gun Q to $q^2$ so that the safe clearance $y$ is obtained between the muzzle of gun at position $q^2$ and the projectile fired along the center line from $p^1$. If the gun P is fired in position $p^1$ it is obvious that the gun Q is safe to the left of the position $q^2$ but unsafe to the right of it; therefore this point shows the beginning of the danger angle for the gun Q with reference to firing from the gun P. The arc N denotes this unsafe angle. Now train the gun Q to $q^3$, the gun P to $p^2$ when the center line of $p^2$ is at right angles to the center line of $q^3$, the clearance $y$ being obtained as before; then if the gun P is trained to the right of $p^2$ it cannot endanger Q in any position.

The angle therefore formed by the center lines $p^2$ and $p^1$ will represent the total danger angle for the gun P with reference to its own dangerous firing on the gun Q provided that the gun Q be trained somewhere on the arc N.

Now it will be seen that it is not always necessary to prevent the gun P from firing because it is trained to the left of $p^2$ while the gun Q is trained to the right of $q^2$ and in such case as the gun P being trained on $p$ and the gun Q being trained on $q^6$ it would be unnecessarily restricting the firing of the gun P to allow the danger signal to be sounding in that turret, or even if the gun Q were trained so much to the right as position $q$. Hence this invention provides the following means to prevent this undue restriction of firing.

The danger angle formed by the center lines $p^2$ and $p^1$ is divided into two or more equal or unequal parts. It should be noted that the number of parts, and their equality or otherwise, are decided by the relative positions of the guns and the amount of cross firing which it is desired to allow. The diagram shows the angle divided into 3 equal parts A. B and C. Train the gun P to $p^3$ which is to the extreme left side of the angle A; produce the center line $p^3$ and train the gun Q to $q^4$ so that the necessary clearance $y$ is obtained between the muzzle of the gun in position $q^4$ and the projectile on the center line $p^3$.

Note the training of $q^4$ and obtain the angle to the right of $q^4$ denoted by the arc O. If then the gun P is fired in position $p^3$, the gun Q is in danger if trained on the arc O and out of danger if trained to the left of this.

Obtain similarly the angle shown by the arc M with the gun Q in position $q^5$ and the gun P in position $p^4$. If then the gun P is fired in position $p^4$, the gun Q is in danger from $p^4$, if the gun Q is trained on the arc M and out of danger if trained to the left of this. Similarly obtain angles denoted by arcs F. E and D for the gun P, the total danger angle for the gun Q being for example divided into the desired parts G. H. K.

Switches $S^1$ and $S^2$ fixed to a structure other than the gun P are provided worked by cams $A^1 B^1 C^1$ and $F^1 E^1 D^1$ fixed to the turret trunk or other suitable part of the gun mounting. Any part which has a movement corresponding to the training of the gun P will serve. These cams are formed to correspond to the angles A.B.C and F.E.D. and cause the switches $S^1 S^2$ to make electrical contacts with $A^2 B^2 C^2$ and $F^2 E^2 D^2$ when the gun is trained over angles of similar lettering. Similarly for the gun Q, switches $S^3 S^4$, cams $G^1 H^1 K^1$ and $N^1 M^1 O^1$ and switch contacts $G^2 H^2 K^2$ and $N^2 M^2 O^2$ are provided. Contacts $A^2$ and $O^2$, $B^2$ and $M^2$, $C^2$ and $N^2$, $F^2$ and $K^2$, $E^2$ and $H^2$, $D^2$ and $G^2$ are respectively joined by wires between the turrets containing the guns P and Q as shown.

"Danger right" trumpets R and "Danger left" trumpets L are connected as shown to one of the electrical supply mains V for the gun P and similar trumpets in the turret containing the gun Q are connected to the main W all as indicated on the drawing. Only one trumpet L and one trumpet R are necessary in one turret. Three are shown connected in parallel for additional safety in case of damage or breakdown. Any number may be thus connected or run in duplicate from any convenient part of the system.

Following the electrical connections made as described by the training of the two guns, it will be seen that if the gun P is trained within the angle A the danger trumpets L will only be energized in the turret containing the gun P while the gun Q is trained on the arc O; and again if the gun P is trained within the angle B the danger trumpets L will only be energized in the turret containing the gun P when the gun Q is trained on the arc M; and again if the gun P is trained within the angle C only when the gun Q is trained on the arc N. Similarly if the gun Q is trained within the angle G the danger trumpets R will only be energized in the turret containing the gun Q, when the gun P is trained on the arc D; and again if the gun Q is trained within the angle H the danger trumpets R will only be energized in the turret containing the gun Q when the gun P is trained on the arc E; and again if the gun Q is trained within the angle K only when the gun P is trained on the arc F. Thus the danger trumpets are actuated in either turret according to the relative training of the guns and only when the training is such as shown. The mutual danger angles of interference have been so dealt with by the means shown that the firing of neither gun is unnecessarily restricted to any practical extent.

It will be noticed that only three conductors are required to be taken up into the turret for any gun mounting having both "Danger right" and "Danger left" trumpets (see dotted lines for the circuits to adjacent turrets not shown as well as full lines for the turrets containing the guns P and Q).

Two wires only are necessary if a gun can endanger another gun or guns on one side of its training only and therefore requires only one sort of trumpet (see circuits in full lines).

In certain cases the arrangement and training of guns are such as to allow of a gun, when trained to its right or to its left, endangering more than one other gun or part of a gun mounting.

It is obvious that the mutual danger angles of interference can be worked out for all or any such cases in a similar manner to that just explained for guns P and Q; and by the means employed it is not necessary to provide duplicate danger trumpets or like gear, for such cases. For instance suppose the gun P could also endanger another gun not shown and to the left of the gun Q when the gun P is trained within say the angle C. The only additional apparatus which would be necessary to enable the danger signal to be correctly given would be as follows: the wire Z would be continued or connected to a switch contact X in a switch having its switch arm $X^1$ connected to the main W and operated by a suitable cam $X^2$ fixed to the turret trunk of the gun in question; so that contact is made when the gun to the left of the gun Q has been trained over such an angle as to be endangered by the firing of the gun P when the gun P was trained within the angle C.

Figs. 2 and 3 are diagrams showing the gun mountings 1 2 3 4 and 5 as arranged for a part of a battleship with, in Fig. 2, the danger angles of mutual interference for 1, 3 and 5 worked out as before described and in Fig. 3 the corresponding cams and switches for the same.

It will be noted that in Fig. 2, the danger angles for 1 relating to 3 are $a^1, a^2\ a^3\ a^4\ a^5\ a^6\ a^7$ and in Fig. 3 the cams have corresponding lettering. The relative position of the cams to the switches $s^1\ s^2\ s^3\ s^4\ s^5\ s^6\ s^7\ s^8\ s^9\ s^{10}$ will be as shown when the guns are trained in the direction indicated by the arrows. The cams are shown at different diameters for clearness.

It will be noticed that the total danger angle for turret 3 with reference to its firing into turret 1 has been divided up in parts $c^1\ c^2\ c^3$. The part $c^3$ has been purposely made of such a size that it forms also the total danger angle for turret 3 with reference to its firing into the tail of the gun shield of turret 1. The said tail of turret 1 will be foul of the firing line of one gun in turret 3 when turret 3 is trained hard over to its right and while turret 1 is trained on the arc $a^7$. Thus with the addition of a corresponding cam $a^7$ on the same level as $a^4$ and working the same switch $s^2$ and without further gear or connections adequate danger signals are given to the turret 3 when firing from the turret 3 endangers either the muzzles or the tail of the gun shield of the turret 1. The danger angles of mutual interference and corresponding cams for gun mountings 1, 2 and 4 are not shown in Figs. 2 and 3.

The angles and corresponding cams $e^1\ e^2\ e^3\ e^4\ e^5\ e^6$ for gun mounting 5 refer to the dangerous firing from the turret 5 with regard to another gun on its left, not shown in Figs. 2 or 3.

Fig. 4 shows the arrangement of the apparatus and cable connections for the gun mountings, 1 2 3 4 5 as arranged for part of a battleship in which $j$ are junction boxes, R "Danger right" trumpets, L "Danger left" trumpets, Y motor-alternators, $u$ a change-over switch, $l$ fuse boxes, $m$ automatic motor starters, $V^1$ a volt-meter, and I the 8-core cable. The point where connection is made to the ship's electric light mains is indicated by + and −.

It should be noted that if all the gun mountings for the ship were indicated in Fig. 4, the 8-core cable I would be continued to form a complete ring; the connections to the gun mountings not shown being similar to those shown for turrets 1, 4 and 5.

Fig. 5 shows a "danger" switch with part of the lid cut away adapted to be worked by three cams $k^1$ $k^2$ $k^3$ which are fixed to the turret trunk T and engage with the roller $r$ at the end of the external switch arm $S^5$. A spring $P^1$ causes the roller to press against the surface of the cams. The movement and position of the internal switch arm S correspond therefore to the level of cams $k^1 k^2$ or $k^3$ in contact with the roller $r$ and corresponding contact is made between switch arm S and one, two or all of the corresponding contacts $s^{15}$ $s^{16}$ $s^{17}$. When no cams are working $r$, the switch arm S will not be in contact with either of the said contacts $s^{15}$, $s^{16}$ or $s^{17}$.

In Fig. 6 the general construction of the danger trumpet is indicated. This device consists of a casing $t$ provided with a trumpet mouth $t^1$ and contains an electromagnet $t^2$ which is energized by an alternating current. At one end of the electromagnet the vibrating diaphragm $t^3$ is arranged in a similar manner to that in an ordinary telephone receiver, while at the opposite end of the electromagnet a yoke or back armature $t^4$ is pivoted on pivots $t^5$ to which is connected an indicating plate $t$ adapted to act against the tension of the spring $t^7$. When the electromagnet is energized the back armature $t^4$ is pulled toward the poles of the electromagnet $C^2$ and the indicating plate $t^6$ is drawn against the tension of the spring $t^7$ in front of the window $t^8$, giving a visual indication which danger trumpet is working.

An important feature in the working of the trumpet is the use of an intermittent or alternating current of high frequency, preferably the latter, as the device can then easily be made quite water tight and possess no moving contacts; and therefore nothing requires adjustment or is likely to be put out of action.

Each of the danger trumpets is marked with the words "Danger right" or "Danger left" or other suitable distinctive phrase; so that the operators can see by the indicator in which direction the training is a dangerous one.

It is clear that the same system may be used to give warning to gun operators when their fire may endanger any portion of the ship's structure whether movable or fixed.

Having now described my invention, I declare that what I claim and desire to secure by Letters Patent is:—

1. Means for automatically signaling certain positions of a gun or guns relative to another gun or other guns consisting of in combination electric switches controlling electric signaling devices, means operated by the training movement of the guns for working said switches when the gun or guns are within danger angles of mutual interference, signaling devices situated at each gun position, and electric circuits connecting the signaling devices through the electric switches with a source of electric energy, the electric switches being arranged to close the circuits of the signaling device belonging to that gun only which is liable to damage an adjacent gun or guns.

2. Means for automatically signaling certain positions of a gun or guns relative to another gun or other guns consisting of in combination two sets of cam surfaces moving with the gun, one set of surfaces being relative to the positions of the gun to endanger another gun or other guns, another set of surfaces being relative to the positions of danger from another gun or other guns, electric switches fixed relative to the axis of rotation of the guns and operated by the said cam surfaces, signaling devices in proximity to each gun or set of guns, and electric circuits connecting said signaling devices through the said switches with a source of electric energy.

3. Means for automatically signaling certain positions of a gun or guns relative to another gun or other guns, consisting of in combination, signaling devices placed in proximity to the gun and adapted each to indicate one of two distinct kinds or regions of danger from gun-fire, electrical circuits so arranged that distinctive signals are given by the signaling device or devices in each turret corresponding to the aforesaid two kinds or regions of danger, three electrical conductors, connecting the said signaling devices to the said electrical circuits means for connecting the said electrical circuits to a source of electrical energy and switch mechanism operated by the guns or turrets adapted to close the circuit or circuits between the source of electric energy and the corresponding signaling device or devices placed adjacent to the gun whenever the said gun is trained in a position such as to endanger by its fire another gun, other guns, or their mounting or mountings.

4. Means for automatically signaling certain positions of a gun or guns relative to another gun or other guns, consisting of in combination, signaling devices situated at each gun position, electrical circuits adapted to connect the said signaling devices to a source of electric energy, and switches controlling the said signaling devices having contacts relating to the sub-divisions of the danger angles of mutual interference and adapted to make such contacts by increments of movement caused by the training of the guns coincident with the limits of each subdivision of the danger angles, and to close the circuit of the appropriate signaling device belonging to any gun which is trained within a subdivision of its "endangering" angle whenever another gun is or other guns are trained within the corresponding subdivision of its "endangered" angle.

In testimony whereof I have signed my name to this specification in the presence of two subscribing witnesses.

WILLIE DICKSON KILROY.

Witnesses:
 RICHARD A. HOFFMANN,
 CHARLES CARTER.